UNITED STATES PATENT OFFICE.

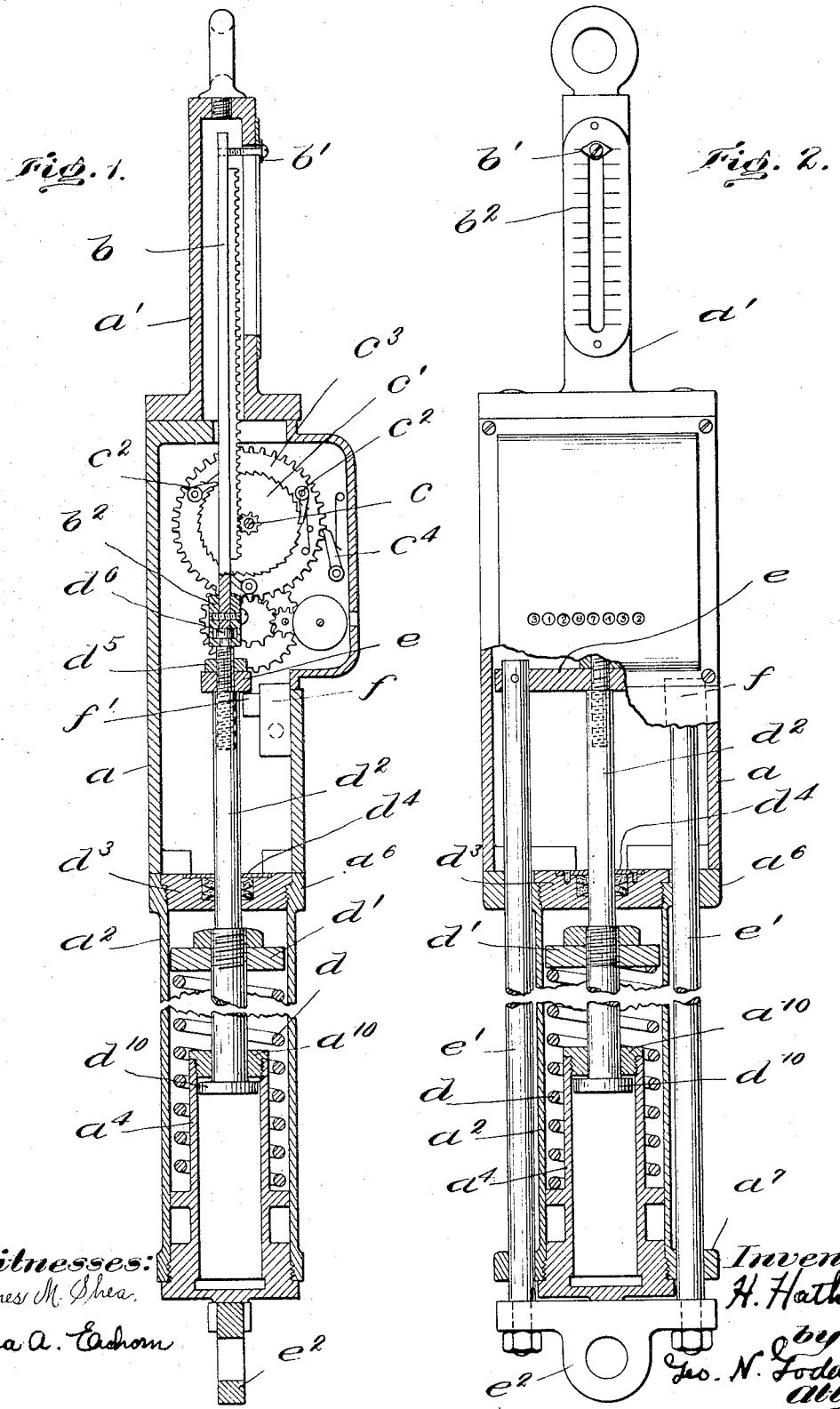

HOSEA HATHAWAY, OF BOSTON, MASSACHUSETTS.

WEIGHING AND ADDING SCALE.

1,153,222. Specification of Letters Patent. Patented Sept. 14, 1915.

Application filed November 4, 1912. Serial No. 729,352.

*To all whom it may concern:*

Be it known that I, HOSEA HATHAWAY, citizen of the United States, and resident of Boston, Massachusetts, county of Suffolk, have invented certain new and useful Improvements in Weighing and Adding Scales, of which the following is a specification.

This invention relates to improvements in automatic weighing and adding scales of the type covered in my pending application for United States Letters Patent filed November 11, 1908, in which the actuating rod of the weight-indicating mechanism was disconnected from the draft or weight suspension rod, so as to give the weight suspension head time to come to rest before the scale-bar or actuating-bar of the indicating mechanism descends to its proper position to indicate the weight of the load. In that construction the fluid containing check chamber was provided with a stuffing box in its lower end through which the draft rod passed.

I have found that occasionally there is a tendency to leakage through the lower stuffing box and have, therefore, devised the arrangement and construction hereinafter described to overcome this objection.

Other features of improvement will also be hereinafter described and defined in the claims appended hereto.

Figure 1 is a side elevation in central section of the complete device with its middle portion partly broken away to shorten its length; and Fig. 2 is a front elevation partly broken away to show the interior.

In the practice of this invention according to the form illustrated, I provide a hollow casing $a$ adapted to receive the adding or total weight indicating mechanism, said casing being provided with a hollow upward extension $a'$ to receive the rack-bar or scale-bar $b$ which carries a pointer $b'$ projecting through a vertical slot in said extension $a'$, so as to show on an indicating dial or scale $b^2$ the weight of each individual load.

The casing $a$ is also provided with a smaller and preferably cylindrical downward extension $a^2$, which serves as the dash pot or fluid-containing check chamber, whose upper end is closed by means of the close fitting disk $d^3$, which is centrally perforated to form a stuffing box surrounding the piston rod $d^2$. The stuffing box is provided with a pair of cup-washers of leather or the like, arranged back to back and pressed together by means of the retaining plate $d^4$, which is held in place by screws or otherwise. The suspension member for carrying the load in this case comprises a cross-bar $e$ in which are secured parallel vertical draft-rods $e'$ whose lower ends support a cross-connecting weight block $e^2$ provided with an eye, for the purpose of carrying a hook or scale pan by which the load to be weighed may be supported. The vertical draft-rods $e'$ pass through upper and lower bearings formed in the annular outwardly projecting flanges $a^6$, $a^7$ of the cylinder $a^2$, by which they are properly guided in their vertical movement.

Of course when a load is thrown on the scale the momentum of the downward movement tends to carry it by the position which indicates its true weight. To prevent this, I provide a dash pot or fluid-check device comprising essentially the plunger rod $d^2$ connected to the cross-bar $e$ of the suspension member and passing through the stuffing box into the interior of the reservoir or chamber $a^2$. This plunger rod $d^2$ is provided with a piston $d'$ which almost fills the transverse bore of the cylinder $a^2$, space being left, however, to allow the oil or other fluid to flow from one side of the piston to the other when the piston descends. The piston $d'$ rests upon the weighing or tension spring $d$ which is seated in the chamber $a^2$ and which yields according to the amount of weight placed on the scale.

I have shown also a supplemental check-chamber $a^4$ formed within the main oil chamber $a^2$ and provided with a closed head $a^{10}$, through which the lower end of the piston rod $d^2$ passes, said piston rod carrying at its lower end a supplemental piston $d^{10}$. This construction leaves an annular recess to receive the tension spring, and also acts as a supplemental check, as it also contains liquid which is free to pass from one side of the piston $d^{10}$ to the other, as the piston descends.

The upper end of the piston rod $d^2$ is secured to the cross-bar $e$ of the suspension member by means of a machine screw $d^6$, which is tapped through the cross-bar $e$ into the upper end of the piston rod $d^2$. The head of said screw is held in the recess formed in the split or sectional retaining block $b^2$, which is fastened to the lower end of the scale-bar $b$ so as to provide a vertical adjustable connection between the scale-bar $b$ and the check piston $d^2$. This adjustable and extensible connection between these two members makes it possible to set the scale accurately in case of any change in the resiliency of the weight spring $d$. A check nut $d^5$ holds the parts securely locked in their proper position of adjustment. The automatic adding indicator is similar in principle to those commonly used, so that it is unnecessary to show all the details of its construction. It comprises essentially, a shaft $c$ carrying a pinion meshing with the rack-bar $b$ and carrying also a ratchet $c'$ by which movement in one direction is transmitted to the master wheel $c^3$ of the adding mechanism by means of the pawls $c^2$. Reverse rotation of the master wheel is prevented by the spring pressed pawl $c^4$.

To prevent others from meddling with the scale, a lock $f$ is provided whose bolt $f'$ is so arranged as to be thrown into or out of engagement with cross-bar $e$ of the suspension member, so that the scale can only be released for service after it has been unlocked by the proper key.

It will be seen that by the above described arrangement, I have made not only provision for adjustment of the weighing and indicating mechanism, so that it may be set properly according to the tension of the weighing spring, but have also so arranged the draft or weight suspension member as to make it unnecessary to perforate the lower end of the fluid-check chamber, thereby avoiding all danger of leakage therefrom. The connection between the suspension or draft member and the indicating mechanism is positive as well as adjustable.

By providing a supplemental check chamber, I give the piston rod upper and lower points of support, so as to more perfectly guide it in its movement, and thus lessen the tendency to leakage in the upper stuffing box.

The casing in its entirety embracing the central portion $a$, the downward extension $a^2$ forming the piston chamber, and the upward extension $a'$, may be regarded as the main or supporting frame of the scale. By the arrangement of upper and lower bearings, respectively above and below the travel of the piston $d''$, the reciprocating suspension frame is so guided as to prevent the possibility of binding either of its vertical rods or of the piston, with the result that I secure perfect alinement of the piston with the travel of the suspension frame.

What I claim is:

1. In a weighing and adding scale the combination with weight indicating and adding mechanism of a dash pot whose lower end is imperforate, supporting means therefor, a piston rod and its piston mounted in said dash pot, a weighing spring located within the dash pot to form a yielding support for the piston rod, an external weight-carrying member secured to said piston rod above the dash pot to transfer the pull of the load thereto, and a rack-bar having adjustable connection with the piston rod at one end and having an operative engagement with the weight-indicating and adding mechanism above, substantially as described.

2. The combination with a dash pot and its supporting means of a piston and its piston rod having lateral bearing engagement with the dash pot near the upper and lower ends thereof, a weighing spring supported by the dash pot to yieldingly oppose the downward thrust of the piston rod during the weighing operation, a weight-carrying member secured to the piston rod above the dash pot and having upper and lower bearing engagement with said dash pot to maintain its parallelism with the piston-rod during the weighing operation and weight-indicating mechanism connected with said piston rod, substantially as described.

3. A weighing and adding scale embracing in its construction a weight indicating mechanism including a reciprocating rack-bar, an inclosed oil chamber, a piston rod and its piston working in said chamber, a weighing spring mounted in said chamber to yieldingly sustain said piston, a connecting screw adjustably connecting said rack-bar and said piston rod, a reciprocating suspension frame arranged wholly outside of said chamber and secured to the externally projecting upper end of said piston rod, substantially as described.

4. A weighing and adding scale embracing in its construction a casing provided with a dash pot, a piston and its piston rod mounted in said dash pot and a weighing spring arranged to yieldingly support the piston rod, a weight-carrying member secured to said piston rod above the dash pot to transmit the weight of the load thereby to the weighing spring, a key-controlled bolt for locking the piston rod against downward movement and an indicating mechanism whose actuating member is connected with the piston rod, substantially as described.

5. In a weighing and adding scale the combination of weight-indicating mechanism including a reciprocating scale-bar, a suspension frame comprising parallel vertical rods and cross-bars uniting them at top and bottom, an intermediate piston rod, an oil check cylinder located between the aforesaid vertical rods to receive through its upper end the piston-carrying end of said piston rod, an extensible connection for connecting the scale-bar with the piston rod, substantially as described.

6. The combination of a supporting frame, a piston chamber mounted therein, a reciprocating suspension frame comprising parallel rods united at top and bottom, upper and lower bearing guides mounted to form a guiding support for said rods, a piston located in the piston cylinder between the upper and lower bearings, a piston rod connected with said suspension frame and having its piston end mounted in the piston chamber, a weighing spring arranged to yieldingly support said piston rod and thereby oppose the downward thrust of said suspension frame, substantially as described.

7. The combination of weighing and adding mechanism including a scale-bar, a reciprocating suspension frame, a piston rod connected with said frame, an oil chamber, a supplemental oil check chamber inclosed therein, each of said chambers being provided with a perforated head to receive the piston rod, said piston rod carrying upper and lower pistons located respectively within the outer and inner oil chambers, substantially as described.

8. In a weighing and adding scale the combination with the supporting casing of the dash pot secured thereto, and having two portions of different diameters a piston rod arranged to work in said dash pot and provided with upper and lower pistons of different diameters corresponding to the different diameters of the respective portions of the dash pot which they engage, a compression spring mounted within the dash pot and having supporting engagement with the piston rod, a weight-carrying frame secured to said piston rod above the dash pot and extending downward outside of and below the dash pot and weight-indicating mechanism operatively connected with the piston rod, substantially as described.

In witness whereof, I have subscribed the above specification.

HOSEA HATHAWAY.

In the presence of—
GEORGE A. ROCKWELL,
GEO. N. GODDARD.